United States Patent [19]

Cody et al.

[11] Patent Number: 4,985,135

[45] Date of Patent: Jan. 15, 1991

[54] SURFACE SILYLATED ZEOLITE CATAYSTS, AND PROCESSES FOR THE PREPARATION, AND USE OF SAID CATALYSTS IN THE PRODUCTION OF HIGH OCTANE GASOLINE

[75] Inventors: Ian A. Cody, Clearwater, Canada; Glen P. Hamner, Baton Rouge, La.

[73] Assignee: Exxon Research and Engineering Company, Florham Park, N.J.

[21] Appl. No.: 463,191

[22] Filed: Jan. 10, 1990

Related U.S. Application Data

[62] Division of Ser. No. 292,670, Dec. 30, 1988, Pat. No. 4,906,599.

[51] Int. Cl.$^5$ .............................................. C10G 47/16
[52] U.S. Cl. .................................... 208/114; 208/111
[58] Field of Search ............... 208/111, 114; 585/269, 585/275, 411

[56] References Cited

U.S. PATENT DOCUMENTS

| | | | |
|---|---|---|---|
| 4,390,414 | 6/1983 | Cody | 208/111 |
| 4,451,572 | 5/1984 | Cody | 502/62 |
| 4,541,919 | 9/1985 | LaPierre et al. | 208/111 |
| 4,906,599 | 3/1990 | Cody et al. | 502/66 |

*Primary Examiner*—Anthony McFarlane
*Attorney, Agent, or Firm*—Roy J. Ott

[57] ABSTRACT

A novel zeolite hydrocracking catalyst which contains $NH_4^+$ sites, at ambient temperatures, and surface sites constituted of a chemisorbed silica-containing species, and process for producing said catalyst. The process for preparation of the catalyst includes a series of steps: an initial step wherein an acid zeolite, or acid zeolite hydrocracking catalyst, is treated with an agent, e.g., a nitrogen-containing compound, suitably ammonia, to convert the $H^+$ sites throughout said zeolite framework to $NH_4^+$ sites, and a subsequent post treatment of said $NH_4^+$ zeolite with an organosilane to silylate, modify and form on the surface of said zeolite a chemisorbed silica species, e.g., $—O—Si(CH_3)_3$. The surface silylated catalyst is useful for the production of high octane gasoline. When employed at elevated temperatures in a hydrocracking operation the catalyst will evolve ammonia and convert to a surface silylated $H^+$ zeolite catalyst to produce a high octane gasoline, at low hydrogen consumption.

8 Claims, 1 Drawing Sheet

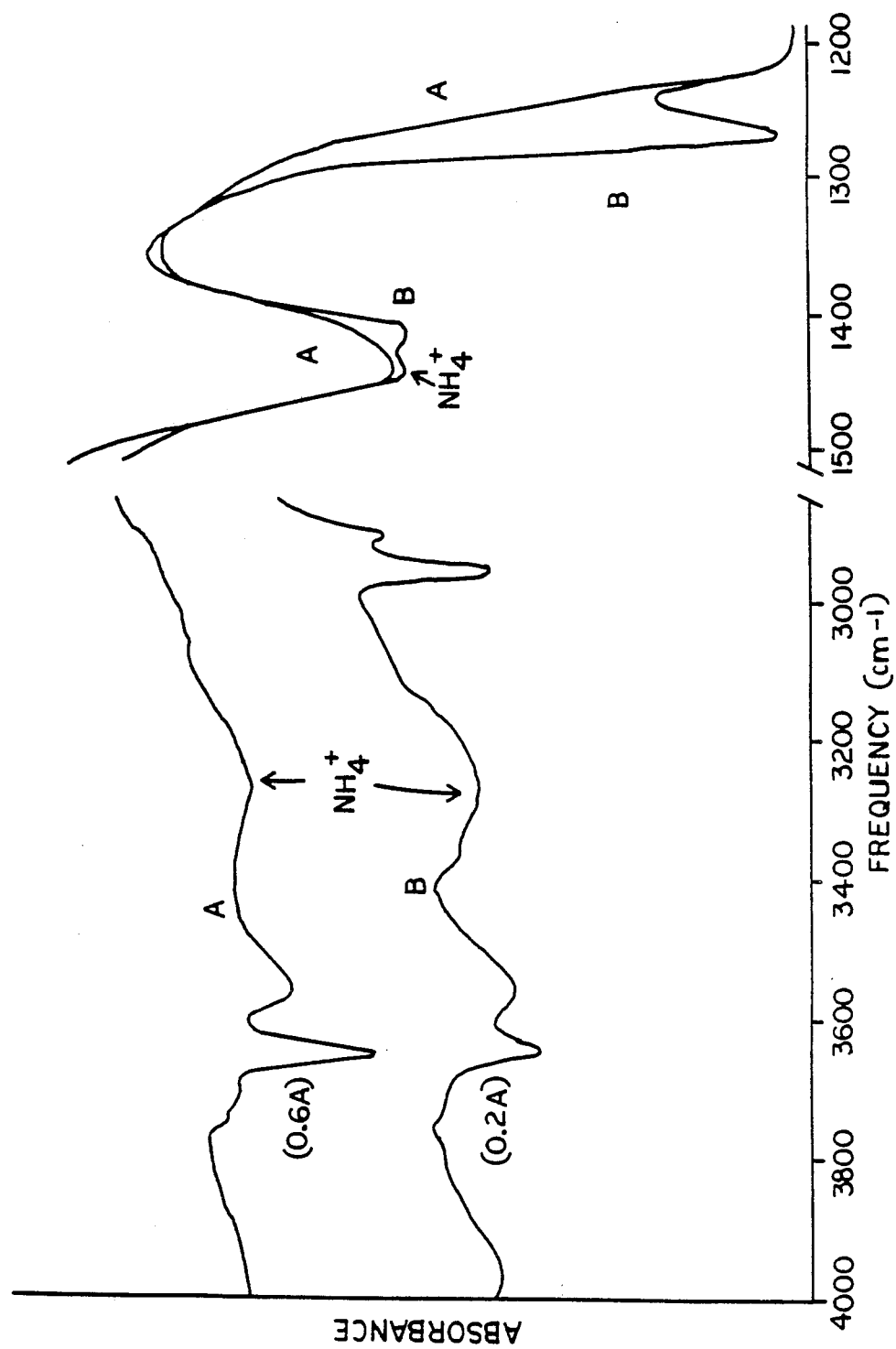

4,985,135

SURFACE SILYLATED ZEOLITE CATAYSTS, AND PROCESSES FOR THE PREPARATION, AND USE OF SAID CATALYSTS IN THE PRODUCTION OF HIGH OCTANE GASOLINE

CROSS REFERENCE TO RELATED APPLICATIONS

This application is a Rule 60 Divisional of U.S. Ser. No. 292,670, filed Dec. 30, 1988, now U.S. Pat. No. 4,906,599.

1. FIELD OF THE INVENTION

This invention relates to hydrocarbon conversion catalysts, and to their preparation and use in hydrocarbon conversion reactions. In particular, it relates to a selectively surface silylated hydrocracking catalyst, a process for the production of said catalyst, and process for the use of said catalyst in selectively hydrocracking aromatic feeds to produce high octane gasoline, at low hydrogen consumption.

2. BACKGROUND

It is known to chemically modify catalytically active zeolite surfaces by silylation with organosilanes. Prior art patents relating to the silylation of zeolite surfaces are, e.g., U.S. Pat. Nos. 4,390,414 and 4,451,572 to Ian A. Cody. These patents disclose the silylation of zeolite to form catalysts useful for hydrodewaxing. The organosilane selected for silylation of a given zeolite, as described by these references, is one capable of entering into the pores of the zeolite to chemically react with available sites within the pores, as well as with hydroxyl sites on the external, or peripheral surface of the treated zeolite. To generate a surface which can be silylated, and which is also catalytically active, the zeolite is ion exchanged with a decomposable ion, e.g., $NH_4^+$, then calcined in air or inert atmosphere to convert the $NH_4^{30}$ sites of the zeolite to $H^+$ sites. The surface of the $H^+$ zeolite, inclusive of the internal surface, or surface within the pores of the zeolite, and the external, or peripheral surface of the $H^+$ zeolite, is then silylated by contact at elevated temperature and anhydrous conditions with the organosilane. The chemically modified zeolite may then be loaded with a catalytically active metal hydrogenation component, or with said catalytically active metal hydrogenation component prior to silylation of the $H^+$ zeolite. At Columns 2 and 3 of each of the patents, there is given a brief review of prior art patents relating to the silylation of zeolites.

Organosilanes, in accordance with the teaching of U.S. Pat. Nos. 4,390,414 and 4,451,572, supra, react with certain $H^+$ zeolites by sequestering hydroxyl sites within the structure, this generating a smaller pore hydrophobic structure. The interior zeolitic sites are thus silylated, along with zeolytic hydroxyl groups on the external surface of the zeolite structure. It therefore occurred to us that a different zeolite catalyst for different uses could be formed by selectively silylating only the external surface, without silylating the internal surface, of the zeolite.

3. OBJECTS

It is, accordingly, a primary object of this invention to provide a process for the production of novel zeolite catalysts by selectively silylating only sites on the external surface of a zeolite, and possibly sites on the binding matrix, without silylating sites within the interior of the zeolite.

In particular, it is an object of this invention to provide a multi step process for the production of novel zeolite hydrogenation catalysts wherein the interior sites of a zeolite are blocked and thereby protected from silylation, and the external surface (but not the internal surface) of the zeolite containing the protected interior sites is then silylated. The external surface-silylated zeolite can then be subsequently reactivated by heating to form said novel zeolite catalysts.

A further object is to provide novel zeolitic hydrocracking catalysts and process utilizing said zeolitic hydrocracking catalysts useful for the production of high octane gasoline, at low hydrogen consumption.

4. REFERENCE TO THE FIGURE

The attached FIGURE depicts an Infra Red spectra of a Pd $NH_4^+H^+$ form of hydrocracking catalyst. The catalyst is described in the examples.

5. THE INVENTION

These objects and others are achieved in accordance with the present invention emodying novel zeolite catalysts which contain both $NH_4^+$ sites (at ambient temperatures), in high concentration, and surface sites of a chemisorbed silica-containing species, process for the preparation of said catalyst, and process for the use of said catalysts in a hydrocracking operation, at elevated temperature, to hydrocrack an aromatic hydrocarbon-containing feed to produce at low hydrogen consumption a naphtha fraction of higher octane than a naphtha fraction produced by catalysts otherwise similar except that they do not contain both $NH_4^+$ sites (at ambient temperatures) and surface sites of a chemisorbed silica-containing species. The novel catalyst of this invention is one where the hydrogenation function has been "turned down" to preserve the aromatics components of the feed thereby preserving the aromatics constituents as components of the naphtha product, resulting in a higher octane product.

The catalyst of this invention may be prepared from an acid zeolite hydrocracking catalyst, or $H^+$ form of crystalline aluminosilicate zeolite, suitably one to which an inorganic oxide binder. e.g., alumina, has been added, in a series of steps: (1) an initial step wherein said acid zeolite, or acid zeolite hydrocracking catalyst, is treated with a nitrogen-containing compound, suitably ammonia, to titrate strong acid sites within the zeolite structure to form $NH_4^+$ sites; and subsequently, (2) the ammonia-treated acid zeolite, or acid zeolite hydrocracking catalyst is treated with an organosilane to silylate and thereby modify its surface properties. Alternately, step (1) may be avoided if the zeolite or hydrocracking catalyst is already in at least a partial $NH_4^+$ form, derived from exchange of the original counter cations such as $Na^+$, $K^+$, etc. The important point is that the interior hydroxyl site population should be essentially zero at the time of the organosilane treatment. A reactive organosilane is also important here, because it has to react with the external surface of the zeolite at temperatures below that at which ammonia will be evolved from the interior site. It is found when the temperature of this modified catalyst is elevated, as when it is employed in hydrocracking an aromatic hydrocarbon-containing feed at elevated temperatures, that ammonia will be evolved and removed from the catalyst leaving the modified exterior surface otherwise intact. The naphtha portion of the hydrocracked product from the modified catalyst will have a significantly higher octane than the naphtha portion of a hydrocracked product from an untreated, or conventional acid zeolite hydrocracking catalyst. Though a somewhat higher operating temperature is required to carry out the hydrocracking operation with the modified catalyst, significantly less hydrogen is consumed in carrying out the hydrocracking operation.

In a conventional process, an aromatic feed, typically a coker gas oil, heavy coker naphtha, or light cat cycle oil, is first hydrotreated to remove nitrogen and sulfur, and then hydrocracked over a zeolite hydrocracking catalyst, e.g., a palladium on zeolite catalyst (HC-18), to make distillate (jet fuel) and motor gasoline. Typically, in the hydrocracking operation about 80% of the feed aromatics is converted into saturates, and consequently a large amount of hydrogen (e.g.. 1700 SCF/Bbl) is consumed. A good quality distillate is produced, but the motor gasoline is generally of low octane and requires reforming to raise its octane number. A further disadvantage of the process is that the hydrotreated feed must have low nitrogen (typically <5 ppm) and sulfur (typically <10 ppm); otherwise the conversion activity of the catalyst will be adversely affected. The surface silylated catalyst of this invention in contrast however, can produce a high octane gasoline (90 RON, and higher), directly, without any necessity of reforming. The catalyst also appears to function well at higher levels of nitrogen and sulfur which reduces, and in some cases may eliminate altogether, the hydrotreating requirement. The amount of hydrogen consumed is generally reduced by about 30 percent, and greater, as contrasted with the conventional hydrocracking operation.

In preparing the catalyst of this invention, an $H^+$ crystalline aluminosilicate zeolite, or $H^+$ crystalline aluminosilicate zeolite to which an inorganic oxide binder, e.g.. alumina, has been added is first treated with ammonia, or a nitrogen-containing compound which will decompose in situ to produce ammonia on contact, or ex situ prior to contact, with the acid zeolite. In treating the acid zeolite in this manner, $H^+$, or strong acid sites inside the zeolite framework, and throughout the zeolite framework which are active hydrocracking sites, are converted to $NH_4^+$. Alternately, the zeolite may be converted into its $NH_4^+$ form by at least partial solution exchange of the original counter cations [e.g., $Na^+$, $K^+$] using solutions of salts such as $NH_4Cl$ or $NH_4NO_3$. In either event, it is necessary to convert in excess of 50 percent, preferably at least 50 percent to about 100 percent, more preferably essentially 100 percent, of the interior zeolitic sites to $NH_4^+$ sites. The $NH_4^+$ modified zeolite is then treated under anhydrous conditions with an organosilane to silylate and modify sites at the exterior surface of the zeolite, or zeolite to which an inorganic oxide binder has been added. The interior zeolitic sites however are protected from silylation due to the presence of the $NH_4^+$ sites, the organosilane reacting with only the zeolitic hydroxyl groups on the external surface, and possibly with sites on the binding matrix. The end result of the series of treatments is that the external surface of the zeolite, or zeolite to which an inorganic oxide binder has been added, contains silylated sites. e.g.. sites of a chemisorbed silica-containing species derived from the organosilane used to treat the zeolite. In treating the $NH_4^+$ zeolite with the organosilane the surface of the $NH_4^+$ zeolite is silylated without affecting internal $NH_4^+$ sites. It is thus important to maintain a high population of $NH_4^+$ sites [in excess of 50 percent of the total internal site] during the silylation step, in order to minimize reaction of the interior acid sites with the silylating agent. Therefore the silylation treatment temperature should not exceed about 250° C., preferably about 200° C., since at higher temperatures ammonia could be released from the interior sites. The internal $NH_4^+$ sites, in other words, block silylation of active hydrocracking sites within the interior of the zeolitic structure. When however the so modified catalyst is employed at elevated temperatures in a hydrocarbon conversion reaction, ammonia is evolved and the more active $H^+$ zeolite form is restored, but with a lowered hydrogenation function. The net effect of these treatments is that some of the hydrogenation sites are nullified, or selectively reduced to produce a hydroconversion catalyst with lowered hydrogenation potential. The hydrogenation function of the zeolitic hydrocracking catalyst is thus reduced, or turned down, such that when employed in a hydrocracking operation the aromatics components of the feed are preserved, passing through the process as part of the product. Since aromatics are of relatively high octane, this results in a high octane naphtha product. Moreover, less hydrogen is consumed in the hydrocracking operation.

In treating a zeolite, or zeolite hydrocracking catalyst, with a nitrogen-containing compound, preferably an anhydrous ammonia gas, the zeolite, or catalyst, is contacted with the ammonia gas at generally ambient temperatures, or temperatures ranging from about 0° C. to about 50° C. Periods ranging from about 0.25 hour to about 2 hours, preferably from about 0.5 hour to about 1 hour, are adequate to form the required amount of $NH_4^+$ sites throughout the zeolite structure. The ammonia treated zeolite, or catalyst, is then post treated with an organosilane at temperatures ranging up to about 250° C., preferably up to about 200° C., to silylate and modify the surface of zeolite, or catalyst, by reaction with the external zeolitic hydroxyl groups, and perhaps with sites on the binding matrix.

The silylation step can be performed in situ, e.g., while the HC-18 catalyst is within the reactor, and on-stream. Thus, in a typical sour gas operation. $NH_3$ and $H_2S$ from the initial hydrotreating step are carried into a first stage hydrocracker. If the temperature is lowered to. e.g., 200° C. $NH_3$ or other N-containing species can temporarily neutralize $H^+$ sites in the zeolite so that a silane subsequently introduced will again react selectively with external sites. In this case, the organosilane should not be a halogen bearing molecule (because these would react with $NH_3$ gas) but one which yields a basic or neutral byproduct upon reaction. Good choices could be, e.g., hexamethyldisilazane and hexamethyldisiloxane. These compounds could be introduced with the feed as a 1 to 5% blend at 1 V/V/H for 1 to 10 hours. Once the reactor temperature is raised to 650° F. and above, the catalyst will behave as the catalyst modified ex situ.

The catalyst of this invention can also be used advantageously in an operation wherein the amount of motor gasoline is increased, and distillate decreased, since the catalyst permits the production of a high octane gasoline. Thus, in the typical process wherein a first stage hydrotreater is employed to reduce the nitrogen and sulfur, and a second stage hydrocracker is employed in series therewith to produce distillate (jet fuel) and motor gasoline as previously described, the bottoms from the hydrotreater are recycled to said hydrotreater to resaturate the 2-ring and 3-ring aromatics. Essentially 100 percent conversion of the product to motor gasoline of high octane can be obtained in this manner. An added advantage is that the sulfur and nitrogen tolerances in the hydrotreater can be relaxed, thereby improving the activity maintainance and operating flexibility of the hydrotreating catalyst.

In forming a hydroconversion catalyst, particularly a hydrocracking catalyst, suitable for conducting a hydrocracking operation in accordance with the practice of this invention a large pore zeolite, or zeolite having an average pore size of about 6 Angstrom Units, or greater, is loaded with a catalytically active hydrogenating metal component prior to or subsequent to silylation. Preferred metals are those selected from Groups VIB and VIII of of the periodic Table of the Elements (Sargent-Welch Scientific Company, Copyright 1968), e.g.. Pt and Pd, which are particularly useful, and preferred, particularly in the range of from about 0.1 percent to about 2 percent, more preferably from about 0.2 to about 0.5 percent, based on the weight of the zeolite (dry basis). preferred zeolites for this purpose are zeolite X, Y, L, Beta, and omega. The metal is added to the zeolite by well known ion exchange methods with a salt of the metal in solution, before or after silylation, as suggested.

Silylation is performed $o_n$ a zeolite which contains at least 50 percent of its sites in the $NH_4^+$ form, as previously described. The $NH_4^+$ zeolite is then silylated by contact with an organosilane or a nonaqueous solution of an organosilane, the $NH_4^+$ sites blocking silylation of active hydrocracking sites within the zeolitic structure. The organosilane is suitably one from the classes:

$SiR_yX_{4-y}$ and $(R_wX_{3-w}Si)_2$-Z;

wherein y=1 to 4; w=1 to 3, R=alkyl, aryl, H, alkoxy, arylalkyl, and wherein R has from 1 to about 10 carbon atoms; X=halide and Z=oxygen, NH, substituted amines or amides.

Examplary of organosilanes useful in the practice of this invention are, e.g., methyl triethoxysilane, prophyl triethoxysilane, dibutyl diethoxysilane, methyl phenoxysilane, diemthyl diethoxysilane, trimethyl exthoxysilane, methyl tri-n-amyloxysilane, ethyl triethoxysilane, isopropyl triethoxysilane, n-butyl triethoxysilane, phenyl triethoxysilane, cyclooctyl triethoxysilane, n-octyl triethoxysilane, methyl (trimethoxyethoxy) silane, hexaethyl disilazane, hexapropyl disilazane, tri-n-octyl triphenyldisilazane, hexaethyl disiloxane, hexaoctyl disiloxane and the like. Hexamethyl disiloxane and hexamethyl disilazane have been found particularly useful.

The silylation step is performed by contacting the $NH_4^+$ zeolite under anhydrous conditions with either vaprous or liquid organosilanes or by dissolving the organosilane in a dry (<10 ppm water) non-reactive liquid solvent, e.g.. hexane, heptane, naphtha, carbon tetrachloride, or hydrocarbon feed to the hydrocracking unit, and contacting the $NH_4^+$ zeolite at temperatures ranging from about 20° C. to about 250° C., preferably from about 50° C. to about 200° C., depending on the zeolite being treated and the organosilane used in the silylation step. Suitably, the silylating solution will contain from about 0.1 percent to about 20 percent, preferably from about 1 percent to about 5 percent of the organosilane, based on the volume of the solution. Silylation of the $NH_4^+$ zeolite nullifies hydrogenation behavior associated with the external zeolite surface, forming in effect a hydroconversion catalyst with a lowered hydrogenation function.

The invention, and its principle and mode of operation will be more fully understood by reference to the following examples, and demonstrations, presenting data illustrating its more salient features. All parts are given in terms of weight except as otherwise expressed.

EXAMPLES

A portion of a Pd (0.25%) $(NH_4)_{0.7}$ $(Na)_{0.3}$ zeolite Y was dried at 400° C., cooled at 45° C., and then treated with anhydrous ammonia gas for 0.5 hour, and the excess gas then removed by heating to 300° C. and maintaining this temperature for 2 hours. At this temperature a partial $NH_4^+$, hydroxyl, form of the zeolite was generated for illustration purposes. Hexamethyldisiloxane was then contacted and treated with the ammoniated zeolite at 32 Torr. Excess hexamethyldisiloxane was then removed by degassing at 140° C. for a 2 hour period. IR spectra were then obtained of the modified zeolite, and the untreated zeolite. These spectra are represented in the attached FIGURE, the modified zeolite being represented by the top graph (A) and the unmodified zeolite by the lower graph (B).

The IR spectra show that the hydroxyl sites, both external to the zeolite structure and internal to the zeolite structure, adsorb at 3740 and 3650/3550 $cm^{-1}$, respectively. When the silane is introduced the intensity of these bands declines, and bands at 1270 and 1410 $cm^{-1}$ appear, consistent with the formation of chemisorbed $-O-Si(CH_3)_3$ species. The $NH_4^+$ sites, however, remain unaffected by the silane. The IR study demonstrates that $NH_4^+$ sites are effective in blocking the reaction of an organosilane with hydroxyl sites within the zeolitic structure.

For conducting further examples, and demonstrations, a portion of an HC-18 zeolite Y catalyst was silylated, modified and converted to form the catalyst of this invention, hydrocracking runs made with both the modified HC-18 zeolite Y catalyst and the untreated HC-18 zeolite Y catalyst, and the runs compared, to wit: Fresh pellets of a Pd-zeolite Y catalyst (HC-18) were dried at 400° C. in dry nitrogen, cooled to 45° C., and then contacted and treated with anhydrous ammonia gas for one-half hour. Thereafter, excess ammonia was purged from the catalyst with nitrogen, and then contacted and treated with hexamethyldisiloxane. The hexamethyldisiloxane was pumped over the catalyst at 100° C. for 1 hour, and the catalyst again purged with nitrogen until free of the hexamethyldisiloxane vapor. The catalyst was then activated by treatment with hydrogen at 400° C.

A typical hydrocracker feed, obtained as the product of a commercial hydrotreating operation, was hydrocracked over the modified HC-18 catalyst and the unmodified HC-18 catalyst. Inspections made on the feedstock, a light cat cycle oil, are given in Table 1.

TABLE 1

| FEEDSTOCK: HYDROTREATED LCCO | |
|---|---|
| Gravity (API) | 26.0 |
| Total Aromatics | 63.3 |
| 2-Ring Aromatics | 6.3 |
| 3-Ring Aromatics | 0.3 |
| 15/5 Distillation (Wt. % Off) | |
| IBP to 320° F. | 2.2 |
| 320 to 550° F. | 58.1 |
| 550° F.+ | 40.3 |
| Nitrogen, ppm | 2 |

TABLE 1-continued

| FEEDSTOCK: HYDROTREATED LCCO | |
|---|---|
| Sulfur, ppm | 5 |

A separate hydrocracking run was made with this feed with each of the catalysts at 1000 psig, 1.0 V/V/Hr, and at a temperature required to produce a 450° F.⁻ (≈233° C.) product, as given in Table 2. As shown by comparison of these data, the modified HC-18 catalyst is less active than the unmodified HC-18 catalyst, requiring a 140° F. (60° C.) or higher temperature to achieve the same conversion to 450° F.⁻ product, but the product of the modified HC-18 catalyst has a much greater proportion of 1-ring aromatic species providing higher octane product with lower hydrogen consumption.

TABLE 2
PROPERTIES OF HYDROCRACKED PRODUCT

| | Catalyst | | | | | | | | | | | | | |
|---|---|---|---|---|---|---|---|---|---|---|---|---|---|---|
| | HC-18 | | | | | Modified HC-18 | | | | | | | | |
| | Reactor Temp., °F. | | | | | | | | | | | | | |
| | 550 | | | | | 690 | | | | | 710 | | | |
| Product Distribution | % Off (Wt.) | Gravity (API) | Aromatics Total | 2R | 3R | % Off (Wt.) | Gravity (API) | Aromatics Total | 2R | 3R | % Off (Wt.) | Gravity (API) | Aromatics Total | 2R | 3R |
| C₅ to 320° F. | 54.0 | 53.9 | 16.2 | 0 | 0 | 30.6 | 47.3 | 64.6 | — | — | 30.9 | 46.3 | 75.6 | 0 | 0 |
| 320 to 450° F. | 28.9 | 38.6 | 35.5 | 0.5 | 0 | 31.0 | 31.5 | 71.3 | 1.9 | — | 25.0 | 31.7 | 72.1 | 1.9 | — |
| 450 to 550° F. | 10.0 | 41.8 | 29.0 | 1.3 | 0 | 21.9 | 33.6 | 54.7 | 10.2 | — | 21.6 | 34.3 | 50.6 | 10.3 | 0 |
| 550 to 650° F. | 7.1 | — | — | — | — | 5.4 | 36.4 | 31.1 | 12.5 | — | 17.0 | 35.8 | 30.9 | 17.4 | 2.4 |
| 650° F.+ | | | | | | 11.1 | 33.4 | 21.9 | 8.9 | 5.3 | 5.5 | 22.2 | 46.3 | 11.4 | 31.1 |
| RON (C₅ to 450° F.) | | 71.1 | | | | | — | | | | | 91.7 | | | |
| Aromatics in T.L.P. | | | | | | | | | | | | | | | |
| Total | | 29.3 | | | | | 58.2 | | | | | 71.4 | | | |
| 2-Ring | | 1.1 | | | | | 5.4 | | | | | 5.8 | | | |
| 3-Ring | | 0 | | | | | 0.1 | | | | | 2.1 | | | |
| Hydrogen Consumption (SCF/Bbl) | | 1722 | | | | | 1023 | | | | | 1313 | | | |

(1) Other conditions: Pressure (pure H₂) = 1000 psig; space velocity = 1.0 V/V/H.

The data thus clearly show for the modified HC-18 catalyst vis-a-vis the unmodified HC-18 catalyst; an RON octane number of 91.7 vis-a-vis 71.1, a total aromatics concentration in the 450° F.⁻ product essentially double, or more than double, that of the product formed from the unmodified HC-18 product, i.e., 58.2 (or 71.4) wt. % vis-a-vis 29.3 wt. %, and a greatly decreased hydrogen consumption. i.e., 1023 SCF-Bbl (or at higher temperature 1313 SCF/Bbl) vis-a-vis 1722 SCF/Bbl.

The catalysts of this invention are useful for conducting hydrocracking reactions at hydrocracking conditions defined generally, and typically as follows:

| | General | Typical |
|---|---|---|
| Temperature, °C. | 280–430 | 320–380 |
| Pressure, psig | 500–3000 | 1500–2500 |
| Gas Rates, SCF/Bbl | 1000–10,000 | 3000–6000 |
| Space Velocity, V/V/Hr. | 0.2–5 | 1–2 |

It is apparent that some modifications and changes can be made in the operation without departing the spirit and scope of the invention.

Having described the invention, what is claimed is:

1. A process for selectively hydrocracking an aromatic hydrocarbon feed which comprises hydrocracking said feed at hydrocracking conditions with a hydrocracking catalyst constituted of a metal hydrogenation component composited with
   a zeolite which contains, at ambient temperatures, greater than 50 percent NH₄⁺ sites, and on its surface a chemisorbed silica-containing species, such that at hydrocracking temperatures ammonia is evolved to convert the zeolite to a surface silylated acid zeolite.
2. The process of claim 1 wherein the zeolite is of average pore size of at least 6A.
3. The process of claim 1 wherein the zeolite is zeolite X, zeolite Y, zeolite L, zeolite Beta, or zeolite omega.
4. The process of claim 1 wherein the zeolite is of average pore size of at least 6A, and is composited with a metal hydrogenation component selected from Group VIB and VIII of the Periodic Table of the Elements.
5. The process of claim 4 wherein the metal hydrogenation component is platinum or palladium.
6. The process of claim 4 wherein the zeolite is zeolite X, zeolite Y, zeolite L, zeolite Beta, zeolite omega.
7. The process of claim 1 wherein the zeolite contains, at ambient temperatures, greater than 50 percent to about 100 percent NH₄⁺ sites.
8. The process of claim 1 wherein the zeolite contains, at ambient temperatures, essentially 100 percent NH₄⁺ sites.

* * * * *